United States Patent
HN et al.

(10) Patent No.: US 12,443,666 B2
(45) Date of Patent: Oct. 14, 2025

(54) SYSTEM AND METHOD FOR ENHANCING THE PHONE CALL EXPERIENCE USING ANALYZED COMMUNICATION ARTIFACTS FOR EMOTIONAL STATE DETECTION

(71) Applicant: Mitel Networks Corporation, Kanata (CA)

(72) Inventors: Shiva HN, Karnataka (IN); Tejas Kanduri Aswathanarayana Murthy, Karnataka (IN); Logendra Naidoo, Ottawa (CA)

(73) Assignee: MITEL NETWORKS CORPORATION, Kanata (CA)

(*) Notice: Subject to any disclaimer, the term of this patent is extended or adjusted under 35 U.S.C. 154(b) by 31 days.

(21) Appl. No.: 18/369,042

(22) Filed: Sep. 15, 2023

(65) Prior Publication Data
US 2025/0094502 A1   Mar. 20, 2025

(51) Int. Cl.
*G06F 7/00* (2006.01)
*G06F 16/951* (2019.01)
*G06F 16/953* (2019.01)
*G10L 15/18* (2013.01)
*G10L 15/30* (2013.01)

(52) U.S. Cl.
CPC .......... *G06F 16/951* (2019.01); *G06F 16/953* (2019.01); *G10L 15/1815* (2013.01); *G10L 15/30* (2013.01)

(58) Field of Classification Search
CPC .............. G06F 16/951; G06F 16/953; G06F 16/24568; G06F 16/3344; G06F 16/382; G06F 16/35; G06F 16/383; G06F 16/45; G06F 40/284; G06F 40/30; G06F 40/216; G10L 15/1815; G10L 15/30; G10L 15/02; G10L 15/04; G10L 15/26
See application file for complete search history.

(56) References Cited

U.S. PATENT DOCUMENTS

| | | | |
|---|---|---|---|
| 9,413,891 | B2 | 8/2016 | Dwyer et al. |
| 2016/0029188 | A1* | 1/2016 | Joels ................. H04M 3/42153 455/414.1 |
| 2021/0209307 | A1* | 7/2021 | Serna ....................... G06F 40/30 |
| 2021/0271864 | A1* | 9/2021 | Litvin .................. G06V 10/764 |
| 2021/0337065 | A1 | 10/2021 | Lee et al. |
| 2023/0045930 | A1 | 2/2023 | Can et al. |

OTHER PUBLICATIONS

EPO; Extended European Search Report dated Jan. 21, 2025 in Application Serial No. 24200610.4.

\* cited by examiner

*Primary Examiner* — Mohammad A Sana

(57) ABSTRACT

An electronic communication method for audio and/or video call sentiment analysis includes receiving, by a second electronic communication system associated with a second user (e.g., the call receiver), an audio and/or video call request from a first electronic communication system associated with a first user (e.g., the call sender). The method further includes determining a sentiment/disposition of the first user. The method further includes displaying, on a graphical user interface of the second electronic communication system, the sentiment/disposition of the second user to indicate to the second user a disposition of the first user. The sentiment can be displayed on the receiver's electronic communication system before the receiver answers the call.

19 Claims, 4 Drawing Sheets

| | Call Importance or Preference |
|---|---|
| 305a | Urgent or Critical Call |
| 305b | Calm and Friendly Demeanor |
| 305c | Moderately Urgent Call |

SYSTEM AND METHOD FOR ENHANCING THE PHONE CALL EXPERIENCE USING ANALYZED COMMUNICATION ARTIFACTS FOR EMOTIONAL STATE DETECTION

BACKGROUND

1. Field

This specification relates to systems and methods for audio and/or video calls.

2. Description of the Related Art

Existing solutions to address the challenges of receiving context of a caller or determining the purpose of a call include Caller ID and text-based notifications. Caller ID typically displays the phone number and/or name of the caller on the recipient's phone screen. Caller ID provides basic information about the caller's identity. Some communication platforms and messaging apps use text-based notifications to provide additional context. For example, a notification might display "URGENT" or "Important Meeting Reminder" alongside the caller's name. Information provided by existing caller ID techniques is generally quite basic and lack additional context that could be helpful to the entity receiving the call.

BRIEF DESCRIPTION OF THE DRAWINGS

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein like numerals denote like elements and wherein:

Figure 1:
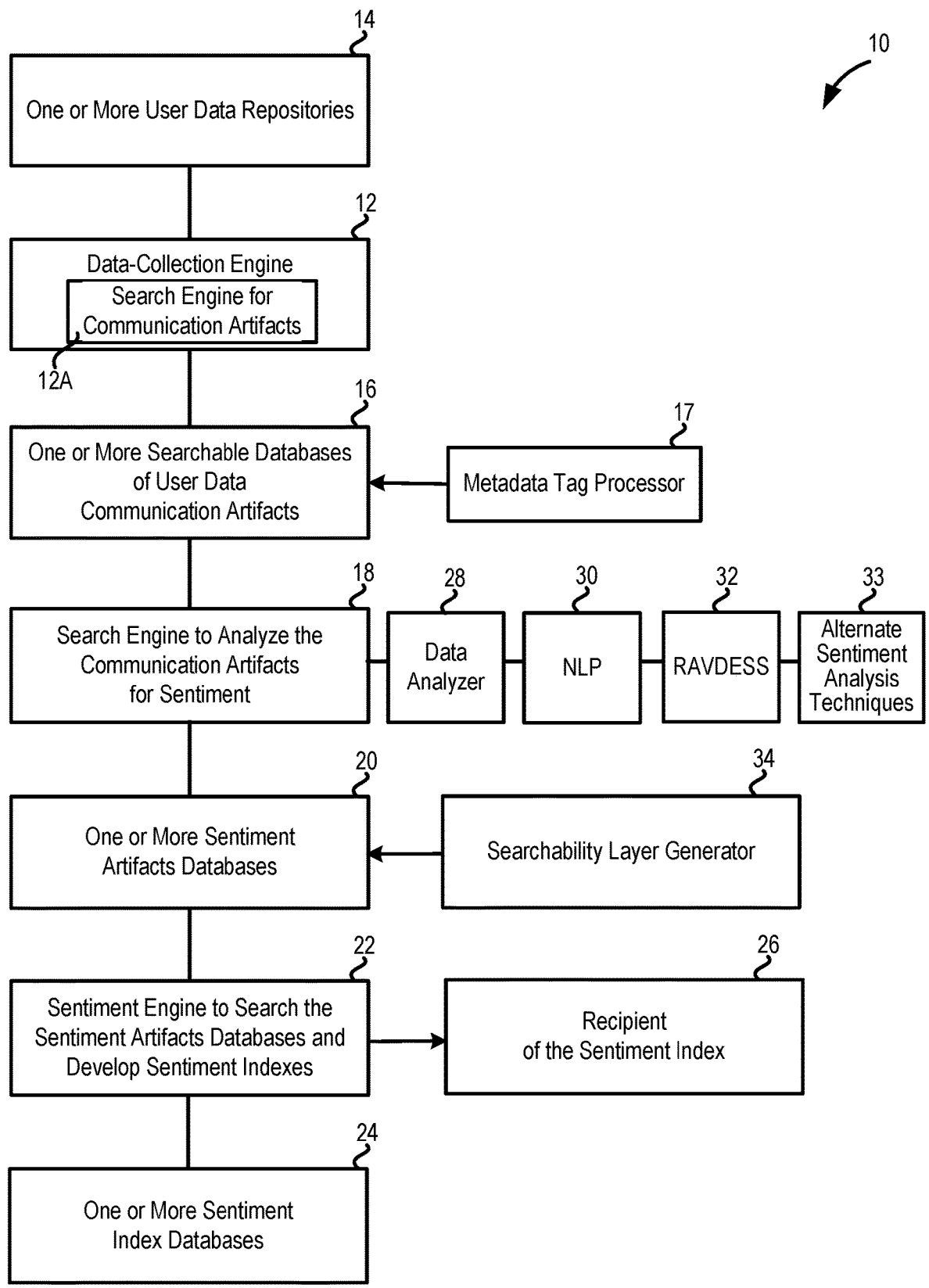
FIG. 1 is an exemplary system according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Existing solutions for providing context to a call generally do not offer insights into the caller's mood or the purpose of the call. The application of sentiment-based analysis to develop a searchable index of a caller can help the receiver of the call gain insights into the attitude, emotions, and opinions of the caller or call participants. By analyzing the sentiment expressed in communication artifacts, such as artifacts from online conferences (dialog and chat) and electronic communications (emails, instant messaging, and others), the receiver can identify areas of agreement, disagreement, positivity, negativity, hope, joy, despair, excitement, contentment, anxiety, anger, and other sentiments. Knowing those metrics can improve call-processing decision-making processes, plus they can be used to enhance the communications and collaborations that take place within the call.

A searchable index of personnel sentiments, including those from conference outputs, can also save time and improve efficiency by making it easier to locate relevant sentiment information quickly. Additionally, sentiment analysis can be applied to customer service interactions and help organizations improve customer service and enhance customer satisfaction. Moreover, sentiment analysis can be applied to call-processing, where the call can be automatically routed to the optimal person or department for handling the call based on the caller's determined sentiment.

Aspects of the present disclose integrate the analysis of communication related artifacts to provide more insight into the person calling. By examining historical call-related data, and applying natural language processing, systems and methods of the present disclosure offer sentiment context.

Additionally, systems and methods of the present disclosure offer a means to adapt sentiment-based context (from the artifacts) by converting the data into visual (and possibly auditory) cues or indicators. Systems and methods of the present disclosure enhance phone call experiences by leveraging the analysis of previous call records and text messages to provide a comprehensive an enhanced understanding of the caller's demeanor and context. Through a means of visual and auditory cues the system can convey the caller's emotional state. This personalized approach enables recipients to respond with empathy and effectiveness, bridging the gap between limited verbal cues and a holistic understanding of the caller. Visual cues allow the recipient to quickly assess the caller's demeanor, urgency level, and emotional context, providing intuitive and easily interpretable information during the call. Auditory cues might be in the form of a tone-based morphology, (akin to a busy signal, error tone, etc.) or advice from virtual digital assistant or Siri, etc. e.g., "Please note that the person you are calling may be feeling "UNHAPPY"). In another embodiment, the system may have a type of ringtone, or when receiving a call, the ringing itself may be designed to elicit the previously analyzed data for sentiment.

Furthermore, aspects of the present disclosure focus on personalization and contextual insights. By analyzing historical data, the present disclosure tailors the caller's experience to specific communication patterns and previous interactions, allowing the recipient to engage in more meaningful conversations. Overall, the present disclosure enhances the user experience by providing additional insight into their disposition and emotion. By knowing the sentiment of a person beforehand, a call participant can personalize their interaction and tailor their approach accordingly. For example, if the interlocutor is upset or frustrated, one can employ empathy and understanding, while if they are happy or satisfied, one can reinforce their positive sentiment—all instead of realizing real-time what the best way to handle the conversation will be.

Systems and methods of the present disclosure can include or be saved on a user's communication device (e.g., a cell phone, a tablet, a computer, etc.) as an application or program, where the application or program communicates with one or more other systems on the user's communication device through an application programming interface (API) or the like.

In general, one aspect of the subject matter described in this disclosure may be embodied in an electronic communication system suitable for audio and/or video call sentiment analysis (or "electronic communication system"). The electronic communication system includes a data-collection engine configured to collect user data that includes communication artifacts that are sentiment-based markers. The electronic communication system further includes one or more searchable databases in communication with the data-collection engine and configured to store the user data. The electronic communication system further includes a search engine in communication with the one or more searchable databases and configured to (a) search the one or more searchable databases for the communication artifacts, (b) analyze the communication artifacts for sentiment to create a sentiment index, and (c) store the sentiment index in a sentiment index database. The electronic communication system further includes a sentiment engine configured to (a) search and analyze the sentiment index database to determine a sentiment index for a first user participating on an audio and/or video call, and (b) send the sentiment index to a second user participating on the audio and/or video call.

These and other embodiments may optionally include one or more of the following features. The sentiment engine can be configured to send the sentiment index to the second user prior to the second user accepting the audio and/or video call.

The electronic communication system can be configured to analyze the audio and/or video call in real time by searching, by the search engine, audio and/or video data of the audio and/or video call in real time for additional communication artifacts associated with the first user, analyzing, by the search engine, the additional communication artifacts for sentiment to update the sentiment index, and sending, by the sentiment engine, the updated sentiment index to the second user.

The search engine can be further configured to separate the sentiment into sentiment types, and store a sentiment index for each sentiment type in a separate sentiment index database. The sentiment type can include, for example, one of anger, frustration, apathy, anxiety, contentment, sadness, happiness, appreciation, enthusiasm, professionalism, responsiveness, courteousness, aggression, and satisfaction. The sentiment engine can be further configured to combine a plurality of the sentiment indexes into an amalgamated sentiment index. The electronic communication system can further include a graphical user interface configured to (a) receive the amalgamated sentiment index from the sentiment engine, and (b) display the amalgamated sentiment index to the second user participating on the audio and/or video call. The sentiment types can also be analyzed without amalgamating the indices. For example, in some examples, the creation of an index for a user may presuppose that sentiment analysis is for (1) an individual user and (2) create an index. However, organizational sentiment can be generated based on the individual measurements for each user, then creating a super index that doesn't include the consolidation of indices.

The electronic communication system can further include a graphical user interface configured to simultaneously display the sentiment index and an option to accept the audio and/or video call to the second user.

In accordance with examples of the disclosure, the sentiment engine, depending on the sentiment index, can do one of the following: (a) nothing, (b) displays the sentiment index on a graphical user interface of the second user, or (c) forwards the audio and/or video call to a third user.

In accordance with examples of the disclosure, if the sentiment index for a predetermined sentiment type is above a predetermined threshold, the sentiment engine does one of the following: (a) terminates the audio and/or video call or (b) forwards the audio and/or video call to a third user.

The communication artifacts include one or more of emails, chats, meeting content, recordings, internet searches and the topics or websites searched, call history, and social media posts, and are in the form of text, audio, or video.

The one or more searchable databases are configured so that each communication artifact is tagged with metadata. The metadata can include identification (ID) data, name, time, and/or type of communication.

The communication artifacts can be analysed by a data analyser in communication with the search engine for sentiment by using one or more of (a) natural language processing (NLP) techniques for text communications, (b) the Ryerson Audio-Visual Database of Emotional Speech and Song (RAVDESS) validated multimodal database of emotional speech and song for audio or video communications, or (c) alternate sentiment analysis techniques.

In another aspect, the subject matter may be embodied in an electronic communication method for audio and/or video call sentiment analysis. An exemplary method includes using a data-collection engine, collecting user data that includes communication artifacts that are sentiment-based markers. The method includes storing the user data in one or more searchable databases in communication with the data-collection engine. The method can further include searching, utilizing a search engine in communication with the one or more searchable databases, the one or more searchable databases for the communication artifacts. The method can further include analyzing, utilizing the search engine, the communication artifacts for sentiment to create a sentiment index. The method can further include storing, utilizing the search engine, the sentiment index in a sentiment index database. The method can further include searching and analyzing, using a sentiment engine, the sentiment index databases to determine a sentiment index for a first user participating on an audio and/or video call. The method can further include sending, using a sentiment engine, the sentiment index to a second user participating on the audio and/or video call.

These and other embodiments may optionally include one or more of the following features. The method can further include the step of the sentiment engine sending the sentiment index to the second user prior to the second user accepting the audio and/or video call.

The method can further include the step of analyzing the audio and/or video call in real time by searching, by the search engine, audio and/or video data of the audio and/or video call in real time for additional communication artifacts associated with the first user, analyzing, by the search engine, the additional communication artifacts for sentiment to update the sentiment index, sending, by the sentiment engine, the updated sentiment index to the second user, and displaying, by a graphical user interface, the updated sentiment index to the second user.

The method can further include the step of displaying, on a graphical user interface, the sentiment index to the second user to notify the second user of a disposition of the first user.

In another aspect, the subject matter may be embodied in an electronic communication method for audio and/or video call that includes sentiment analysis. An exemplary electronic communication method includes receiving, by a second electronic communication system associated with a second user, an audio and/or video call request from a first electronic communication system associated with a first user. The electronic communication method includes determining an amalgamated sentiment index for the first user. The electronic communication method includes displaying, on a graphical user interface of the second electronic communication system, the amalgamated sentiment index to the second user to indicate to the second user a disposition of the first user.

These and other embodiments may optionally include one or more of the following features. The amalgamated sentiment index can be determined by using a data-collection engine, collecting user data associated with the first user that includes communication artifacts that are sentiment-based markers, storing the user data in one or more searchable databases in communication with the data-collection engine, searching, utilizing a search engine in communication with the one or more searchable databases, the one or more searchable databases for the communication artifacts, analyzing, utilizing the search engine, the communication artifacts for sentiment to create a sentiment index, storing, utilizing the search engine, the sentiment index in a sentiment index database, and searching and analyzing, using a sentiment engine, the sentiment index databases to determine the amalgamated sentiment index for the first user, the search engine determines a sentiment index for multiple communications and combines them to create the amalgamated sentiment index.

The electronic communication method can further include receiving user input from the first user indicating a current sentiment of the first user, and displaying, on the graphical user interface of the second electronic communication system, the current sentiment to the second user to indicate the current sentiment of the first user.

Systems and methods of this disclosure thus include the creation of a searchable database that can be used to efficiently search for specific sentiment artifacts. Systems and methods of this disclosure thus include enhancing the call experience using analyzed communication artifacts for emotional state detection. This aspect is particularly useful for gaining context of a call before the call is answered and/or during the call. Additionally, sentiment indexes may be continually updated with new data, which helps to keep the indexes current and accurate.

Turning now to the figures, wherein the purpose is to describe embodiments of this disclosure and not to limit the scope of the claims, FIG. 1 illustrates a system 10 according to aspects of this disclosure. System 10 includes a data-collection engine 12 that collects communications from one or more user data repositories 14, which can include any number of data storages, such as one or more of email servers, conference databases, on-line search databases by call participants, chat databases, databases of social media posts, video recording databases, audio recording databases, social media platforms, recording devices, and others, and includes one or more of audio, electronic text, images, and video communications stored in each of the one or more user data repositories 14. The user data in the one or more user data repositories 14 can be obtained from various user communication channels.

Once the data is collected by data-collection engine 12, it is processed by search engine 12A to extract communication artifacts. Data-collection engine 12 stores the communication artifacts from the one or more user data repositories 14 into one or more databases of communication artifacts 16, wherein each type of different communication artifact may be stored in a separate database 16. The one or more databases 16 can each or respectively contain various types of communication artifacts such as emails, chats, meeting notes, videoconferences, calendar notes, information from written documents, recordings, facial expressions, voice recordings, and social media posts. The communication artifacts can be in the form of text, audio, or video. Each database 16 of the communication artifacts identified by search engine 12A is tagged with metadata not in the communication artifacts, such as ID data, name, date, time, type of communication, and so on, by metadata tag processor 17, which is in communication with or is part of the one or more communication artifacts databases 16. The metadata tagged to the communication artifacts is useful for organizing and searching the one or more databases 16 efficiently. For example, it may be desirable that the artifacts are material to a person's present disposition. Accordingly, the system 10 (e.g., search engine 18) may be configured to analyze communication artifacts within a configurable predetermined time period (e.g., the last twenty-four hours or the last twelve hours). In this regard, the system 10 can perform time-based segmentation of user data.

A search engine 18 is configured to search each of the one or more databases 16 to analyze the communication artifacts for sentiment of the individual (e.g., of a user on a phone call or a video conference) and store the sentiment artifacts in one or more sentiment artifacts databases 20. The sentiment artifacts can include all or portions of the communication artifacts, such as all or portions of email bodies, chat transcripts, social media posts, audio transcripts, audio recordings, and visual recordings. If the sentiment artifacts are in the form of audio recordings, the audio may be transcribed into text. This is useful for searching by sentiment engine 22 the one or more sentiment artifacts databases 20 for specific keywords or phrases to identify sentiment. Or, raw audio recordings may be stored in the one or more sentiment artifacts databases 20. Different sentiments may be saved in different ones of sentiment artifacts databases 20.

Data analyzer 28 is in communication with, or includes, natural language processor (NLP) 30, a RAVDESS module 32, and a processor 33 that includes software configured to access and utilize one or more alternate sentiment analysis techniques, such as those previously mentioned in this disclosure, including (1) a predefined set of sentiment labels assigned by a user, (2) emoji-based indicators, (3) emoticons or emojis, (4) visual content, (5) CRM metrics, and (6) survey feedback, wherein each type of alternate sentiment analysis can be used by search engine 18 to analyze the communication artifacts for sentiment. The NLP 30 may be used to analyze for text communications. Audio and visual communication sentiments may be analyzed by applying the RAVDESS module 32. The processor 33 can be used to analyse sentiment utilizing any one or more of the alternate techniques discussed herein.

A searchability layer, which can be metadata tags, is preferably applied to the one or more sentiment artifact databases 20 by searchability layer generator 34 in order to enable efficient searching of the sentiment artifacts by sentiment engine 22. The metadata tags include information preferably not already included in the sentiment artifacts, such as identification (ID) data, name(s) of person who sent, received, are copied on, or are mentioned in the communication artifacts, time and date associated with the communication artifact, and/or type of communication, such as email, chat, call history, conference, audio or visual call, or social media post, from which the communication artifact originated.

A sentiment engine 22 is configured to search each of the one or more sentiment artifacts databases 20 to determine a sentiment index, which can be numerical score or ranking that indicates the relative strength of a particular sentiment, for an individual, a group, or an organization. The analysis can identify and assign an index for essentially any sentiment, such as one or more of positive, negative, neutral, anger, resentment, contentment, joy, anxiety, peacefulness, displeasure, fear, hope, despair, excitement, and others. The sentiment index can also be an overall or amalgamated sentiment or disposition of the individual, group, or organization (e.g., an overall or amalgamated sentiment taken as an average of a plurality of particular sub-sentiments).

The sentiment index(es) is/are added to the one or more sentiment index databases 24, wherein each database could be specific to a particular sentiment of an individual. A sentiment index database 24 can be searched for a particular sentiment index of an individual, a group, or an organization, for example a user on an audio call and/or a video call. Storing the sentiment index(es) is useful for analyzing the sentiment expressed by an individual over time. The sentiment index may be continually updated with new data as it becomes available. This ensures that the sentiment index(es) remain up-to-date and relevant.

A sentiment index for an individual, group, or the organization may be transmitted to a recipient 26, such as a video-or audio-call participant, or others based on an inquiry to sentiment engine 22, which can provide the sentiment index (1) immediately based on the sentiment index known to it or it can access the one or more sentiment databases 24 to provide a stored sentiment index. In an example, the sentiment index of a user (e.g., user A) can be sent to the recipient 26 in response to a call being made to the recipient from user A. Accordingly, recipient 26 can know the sentiment and/or disposition of the caller before recipient 26 answers the call. The sentiment index of the user can be displayed on a computer or mobile device of the recipient 26 as an overall or amalgamated sentiment of the user A.

In another example, the recipient 26 is the user making the call to the user A, where the sentiment index of user A is sent to the recipient 26 in response to a call being made to the user A from the recipient 26. Accordingly, the recipient 26 can know the sentiment and/or disposition of the receiver of the call (user A) before, during, or shortly after the user A accepts the call.

The sentiment index of the user can be updated using real-time data (e.g., audio or video data of a user recorded during the call) during a conversation between users. For example, search engine 12A can extract communication artifacts from an audio or video stream of the conversation in real-time, search engine 18 can analyze the sentiment of the communication artifacts and update the one or more sentiment artifact databases 20, and sentiment engine 22 then analyzes the one or more sentiment artifacts databases 20 to update one or more sentiment indexes, which is then provided to the recipient 26.

Figure 2:
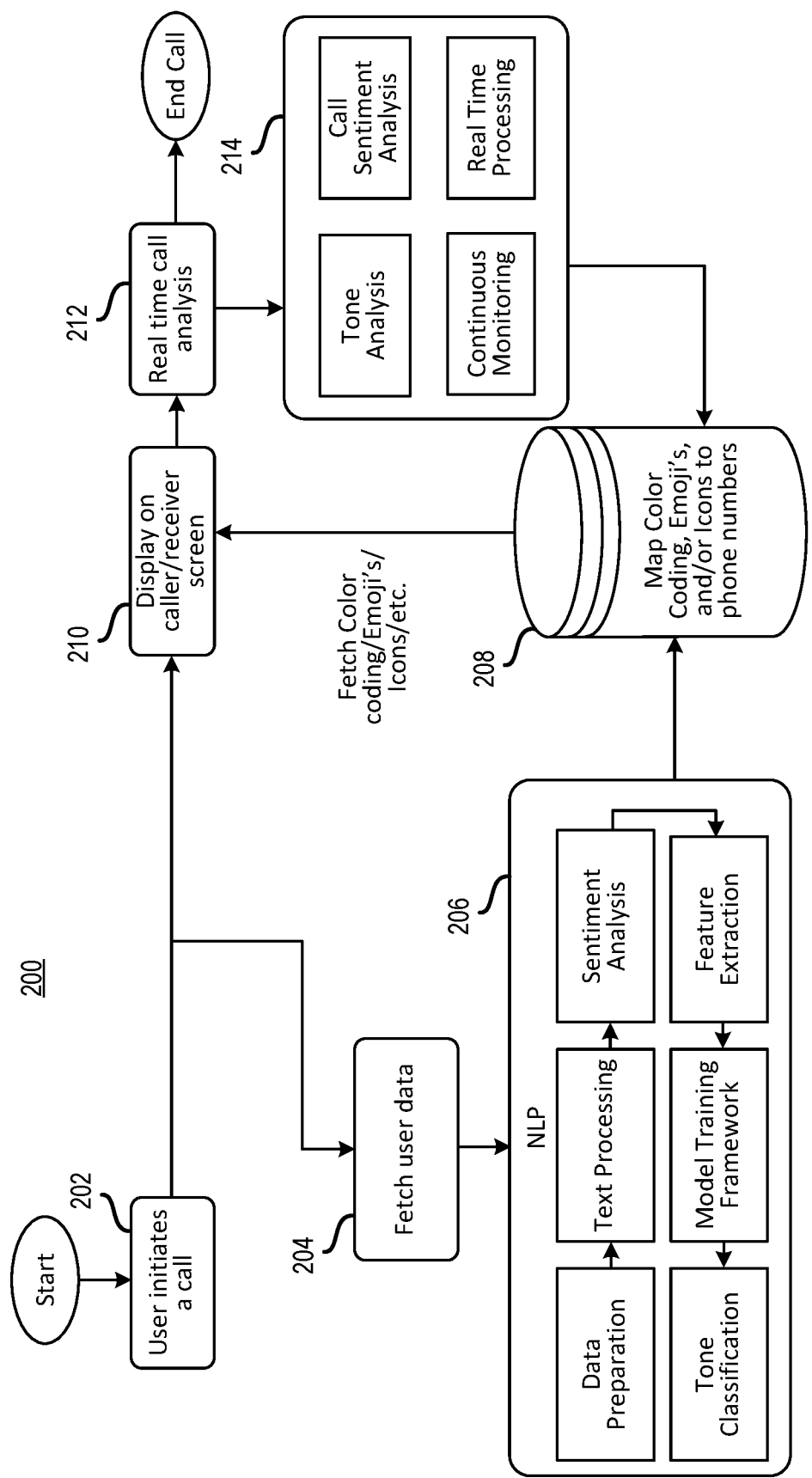
FIG. 2 illustrates an exemplary method according to aspects of this disclosure.

FIG. 2 illustrates a method 200 according to this disclosure. For ease of description, the method 200 is described below with reference to FIG. 1. The method 200 of the present disclosure, however, is not limited to use of the exemplary system 10 of FIG. 1.

The method can start at step 202 when a first user initiates a call (e.g., by taking a phone off-hook, dialling a number, pressing send, and/or sending a call request, etc.). At step 204, user data is collected by data-collection engine 12 from various communication sources and/or user data repositories and stored in user data repositories 14. Example communication sources include email history, text message history, call history, voicemail history, meeting output (e.g., transcripts), and social media history. Example user data repositories include fitness apps, health monitoring apps, etc. These communication sources and/or user data repositories can include metadata such as a user identity, call/text/post times, user location, etc. At step 206 the data is processed, such as by data-collection engine 12. The processed data is then stored in one or more communication artifacts databases 16. A searchability layer (or metadata) is applied to the one or more communication artifacts databases by metadata tag processor 17. This enables efficient searching of the communication artifacts. Communication artifacts can be tagged by processor 17 with the metadata, such as ID data, name, time, and the type of communication.

For audio communications the RAVDESS validated, multi-model database of emotional speech and song may be applied by search engine 18 to analyze the sentiment of the communication artifacts. For textual communications, NLP analysis may be applied to analyze the sentiment by search engine 18. One or more alternate analysis techniques, such as the ones discussed above, may be applied to analyse sentiment. So, one or more of RAVDESS, NLP, and any of the alternate analysis techniques can be used to analyze sentiment. The analyzed sentiment is utilized to create one or more sentiment artifacts databases 20, which preferably have a searchability layer applied by generator 34. Sentiment engine 22 then analyzes the one or more sentiment artifacts databases 20 to create one or more sentiment indexes. These sentiment indexes can be stored in one or more sentiment index databases 24.

At step 208, a sentiment index is mapped to the user, for example by mapping the sentiment index to the user's phone number. If multiple users are on a call, a sentiment index can be mapped to each user. The sentiment index can be expressed using any desirable visual indicator (e.g., color coding, emoji, icon, text, etc.). At step 210, the sentiment index is displayed on call participant's screen. In an example embodiment, the sentiment index of a receiver (i.e., the user receiving the call) is displayed on a caller's screen. In this manner, the person making the call can gain an understanding of the receiver's disposition. In an example embodiment, the sentiment index of a caller is displayed on the receiver's screen. In this manner, the person receiving the call can gain an understanding of the caller's disposition. The person receiving the call can gain an understanding of the caller's disposition before the person receiving the call answers the call. In this regard, the receiver can decide whether and/or how to answer the call based upon the caller's disposition as indicated by the caller's sentiment index displayed on the receiver's screen.

At step 212, the system 10 can perform real-time call analysis to determine a present sentiment of one or more users participating on the call. At step 214 the system 10 can perform tone analysis of a user's voice, for example by applying the RAVDESS module 32, and perform call sentiment analysis, as described herein.

Steps 212, 214, 208, and 210 represent an update loop, wherein the system and method of this disclosure continuously or periodically update a sentiment index of a user participating on the call. Accordingly, system 10 can provide real-time analysis. Stated differently, instead of, and/or in addition to, analyzing communication data after the fact, the system 10 is designed to analyze data in real-time, as it is generated, wherein the organizational data is provided directly to data-collection engine 12. This enables faster responses to emerging issues or trends and enables more proactive engagement with customers or users.

Figures 3, 4:
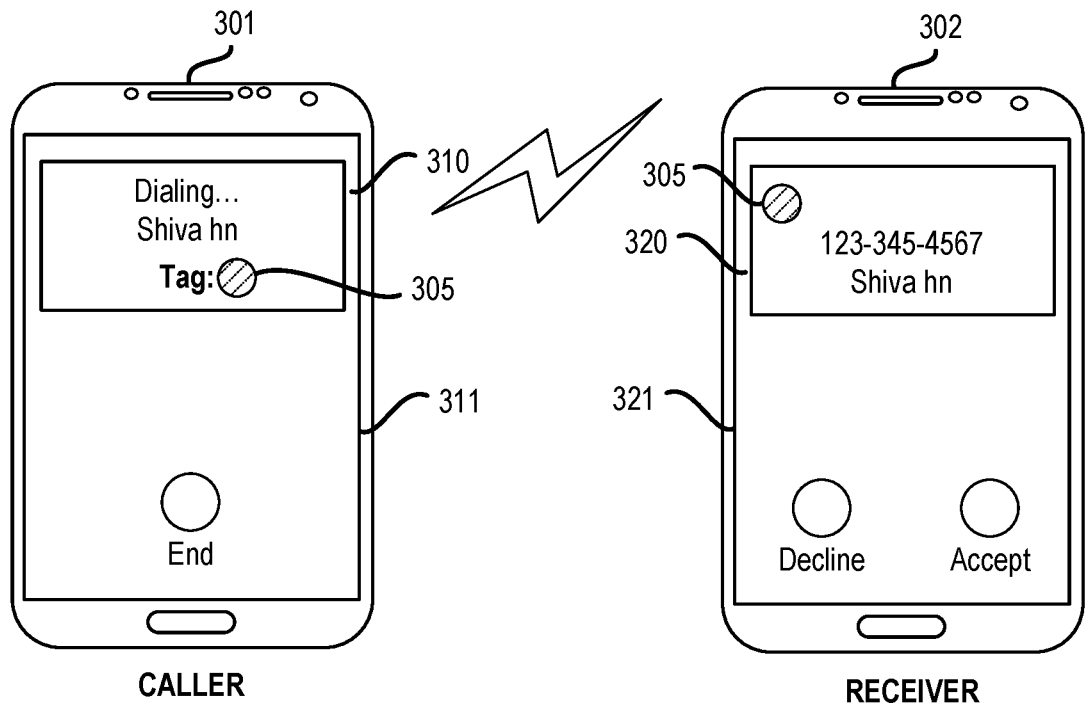
FIG. 3 illustrates exemplary electronic communication systems according to aspects of this disclosure.
FIG. 4 is an example of sentiments for a participant according to aspects of this disclosure.

FIG. 3 illustrates a first electronic communication system 301 associated with a caller (also referred to herein as a first user) making a call to a second electronic communication system 302 associated with a receiver (also referred to herein as a second user). In response to receiving the call, a sentiment index 305 of the caller can be displayed on a graphical user interface 320 (e.g., on a screen 321) of the second electronic communication system 302 to indicate to the receiver a disposition of the caller. The graphical user interface 320 can further display an option to accept or decline the call. In an example embodiment, the second electronic communication system 302 includes the system 10 programmed thereon. In an example embodiment, the first electronic communication system 301 includes the system 10 programmed thereon. Accordingly, the system 10 can be programmed into one or both the first electronic communication system 301 and the second electronic communication system 302. The system 10 can determine the sentiment index 305 as described herein by obtaining user data associated with the caller. The caller can be presented with the user index 305 on a graphical user interface 310 (e.g., on a screen 311). The graphical user interface 310

The graphical user interface 310 can receive user input (e.g., from the caller) whereby the caller can input a current sentiment of the caller. For example, the caller can select the sentiment index 305 and update the sentiment index 305 with a present sentiment, demeanor, and/or disposition. In response to the caller entering the updated sentiment index 305, the updated sentiment index 305 can be sent to the second electronic communication system 302. The second electronic communication system 302 can then display the updated sentiment index 305 on the screen 321.

FIG. 4 illustrates a table of sentiment indexes that can be used to display a user's sentiment and/or disposition. A first sentiment index 305a can indicate that a call is urgent or critical. The first sentiment index 305a can be a first color (e.g., red), an icon, an emoji, or any other suitable indicator. A second sentiment index 305b can indicate that a caller has a friendly and/or calm demeanor. The second sentiment index 305b can be a second color (e.g., green), an icon, an emoji, or any other suitable indicator. A third sentiment index 305c can indicate that a call is moderately urgent. The third sentiment index 305c can be a third color (e.g., yellow), an icon, an emoji, or any other suitable indicator. The options in the table of FIG. 4 can be displayed to the caller when the caller manually updates his/her sentiment. Three exemplary sentiment indexes are illustrated in FIG. 4, though the present disclosure is not limited to three sentiment indexes and more sentiment indexes can be used and/or selected from to indicate a user's sentiment.

Figure 5:
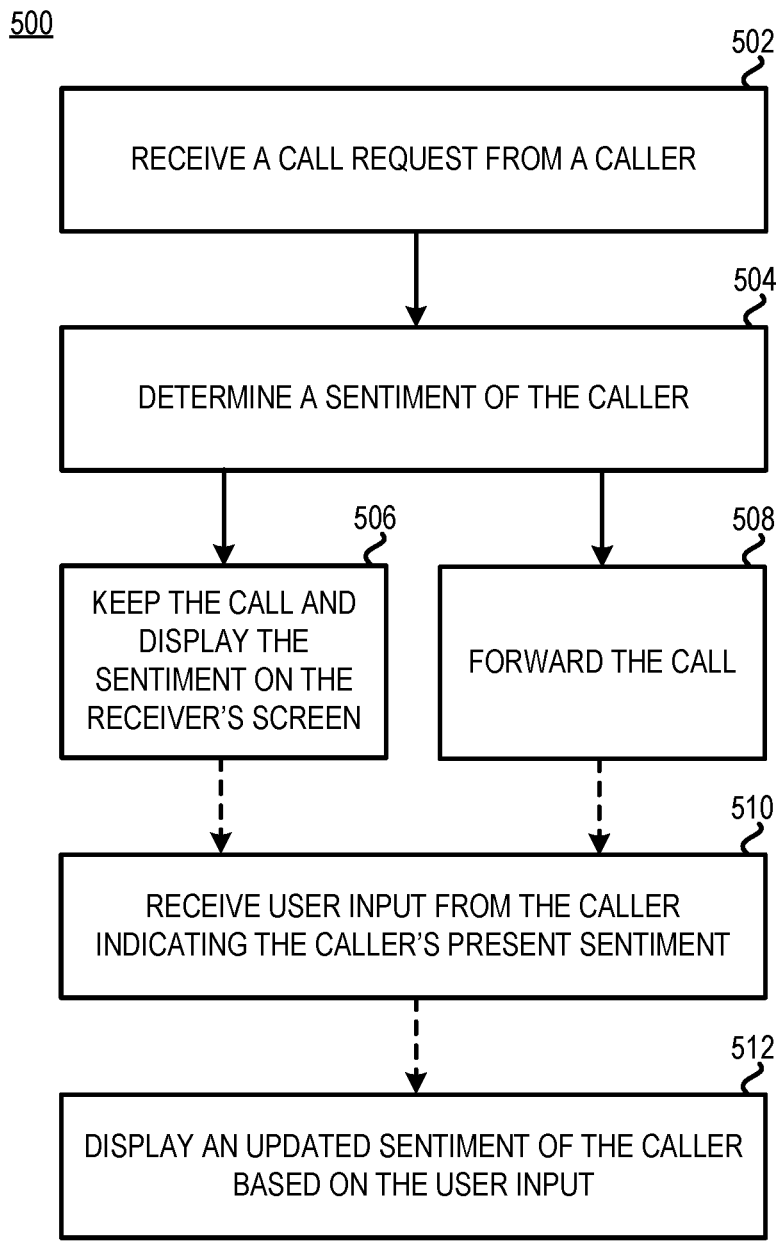
FIG. 5 illustrates an exemplary method according to aspects of this disclosure.

FIG. 5 illustrates a method 500 according to this disclosure. For ease of description, the method 500 is described below with reference to FIG. 1 and FIG. 3. The method 500 of the present disclosure, however, is not limited to use of the exemplary system 10 of FIG. 1.

At step 502, the second electronic communication system 302 can receive a call from the first electronic communication system 301.

At step 504, the system 10 (e.g., which can be stored on the second electronic communication system 302) can determine a sentiment 305 of the caller.

At step 506, depending on the determined sentiment 305 of the caller, the system 10 can keep the call and display the sentiment 305 on the receiver's screen 321.

At step 508, depending on the determined sentiment 305 of the caller, the system 10 can automatically forward the call. In one example, the call can be forwarded to voicemail. In another example, the call can be forwarded to a manager or to another system more suitable for handling the call based on the caller's sentiment 305. The determination of whether to keep the call or forward the call is determined based upon the caller's sentiment and the receiver's ability to handle the call.

The method 500 can further include receiving user input from the caller indicating the caller's present sentiment at step 510. For example, the caller can input an updated/present sentiment via the graphical user interface 310, as discussed herein.

The method 500 can further include displaying the updated sentiment of the caller on the receiver's screen 321 based on the user input.

Overall, the process of analysing and organizing communication data for sentiment analysis is useful for various fields such as customer service, market research, and social media analysis. By understanding the sentiment expressed in the communication data, users and/or organizations can gain valuable insights into user behaviour and preferences, identify potential issues or opportunities, and improve their overall operations.

Example Use Case

A business wants to ensure that calls from client are properly handled. The business has employees who are trained to handle different types of calls depending on the substance of the call, the urgency of the call, and/or the disposition of the client. The business can determine who should answer the call by running a sentiment analysis using available caller data repositories.

In response to receiving a call request (i.e., the phone is ringing), but before answering the phone, the business uses the sentiment engine 22 to search one or more sentiment index databases 24 generated by the system 10 for the caller. Depending on the sentiment index of the caller, the call can be routed to the appropriate person. Moreover, if the sentiment index for a predetermined sentiment type is above a predetermined threshold, the sentiment engine can do one of the following: (a) terminates the audio and/or video call or (b) forwards the audio and/or video call to a third user. For example, the call may have been routed to a first employee trained to handle calls received by callers that are determined to be of a positive disposition (e.g., happy, neutral, excited, etc.). In response to the system 10 determining that the caller is of a negative disposition (e.g., upset, angry, etc.) the system 10 can be configured to automatically reroute the call to a second employee who is trained to handle such escalated calls. In another example, the sentiment of the caller is displayed on the first employee's screen and the first employee can then manually reroute the call, or answer the call and inform the client that their call is being rerouted, etc.

Possible Variations

There are several possible variations to the system and method described herein, depending on the specific needs and goals of the application. Some examples follow:
(1) Integration with machine learning, wherein in addition to sentiment analysis, machine learning algorithms could be incorporated to identify patterns or trends in the communication data that are not immediately apparent to human analysts. This could enable the system 10 to make more accurate predictions or recommendations based on the organizational data.
(2) Customization of sentiment analysis. While the RAVDESS application is a useful tool for analyzing emotional speech and song, it may not capture the full range of emotions expressed in all types of communications. Custom sentiment analysis models could be developed for specific domains or applications, such as healthcare or finance, to better capture the nuances of the language used in those contexts.
(3) Customizable Visual Indicators. Instead of predefined color-coded systems and emojis/icons, the system can allow users to customize their own visual indicators based on their preferences and needs. This customization can include assigning specific colors or icons to different emotional states or urgency levels according to the user's interpretation or communication style.
(4) Integration with Social Media Profiles. To gather more comprehensive information about the caller, the system can integrate with social media platforms. By analyzing the caller's social media profiles, posts, and interactions, the system can gain insights into their interests, activities, and preferences, providing a more holistic view of the caller's persona and context.
(5) Collaborative Call Experience. The system can facilitate a collaborative call experience by allowing multiple recipients to view and contribute to the caller's visual indicators and contextual understanding. This can be particularly useful in call center environments or situations where multiple team members are involved in the conversation.

Other Applications

Apart from customer service, market research, and social media analysis, the system and method described can be applied to various other fields such as:
(1) Video Conferencing: Sentiment analysis, including visual indicators, color coding, and contextual understanding, can be extended to video conferencing platforms. By analyzing previous video conference records, chat logs, and participant interactions, the system can provide visual cues to indicate participants' demeanor, urgency level, and recurring topics. This enhances the understanding of participants' emotions and contexts, leading to more effective and engaging video conferences.
(2) Customer Service Chatbots. Sentiment analysis can be utilized in customer service chatbots to enhance the understanding of customer queries and emotions. By analyzing previous chat records and customer interactions, the chatbot can employ color coding, emojis/icons, and data analysis to gauge the customer's emotional state and context. This enables the chatbot to respond with more empathy, understanding, and tailored assistance, improving the overall customer service experience.
(3) Online Collaboration Tools. Sentiment analysis can be integrated into online collaboration tools such as project management platforms or team communication tools. By analyzing previous team interactions, messages, and sentiment, the system can provide visual indicators and contextual insights. This helps team members better understand each other's moods, priorities, and recurring topics, fostering improved collaboration and communication within the team.
(4) Social Media Platforms. Sentiment analysis can be employed in social media platforms to enhance communication and understanding between users. By analyzing previous posts, comments, and interactions, the system can provide visual cues or indicators to represent users' emotional states or urgency levels. This promotes more empathetic and meaningful interactions, enabling users to better connect and communicate with each other on social media.
(5) Internet commerce. Sentiment analysis can be applied to customer-based searches for services by applying a sentiment rating to certain businesses. The analyzed communication sentiments can produce a less objective score for rating a business. The business rating can be displayed on a receiver's screen when receiving a call from the business.
(6) Human resources. Sentiment analysis can be used to analyze employee feedback and reviews, performance appraisals, and exit interviews to gain insights into employee sentiment, identify areas of improvement, and enhance employee engagement.
(7) Healthcare. Sentiment analysis can be used to analyze patient feedback, reviews, and analyze social media posts to understand patient satisfaction, identify areas of improvement, and enhance patient experience.

(8) Politics. Sentiment analysis can be used to analyze social media posts, speeches, and debates to understand a caller's opinion and/or sentiment towards political parties, candidates, and policies.

(9) Education. Sentiment analysis can be used to analyze student feedback, surveys, and social media posts to understand student sentiment, identify areas of improvement, and enhance student experience.

(10) Finance. Sentiment analysis can be used to analyze financial news, reports, and social media posts to understand investor sentiment and predict market trends.

The systems and methods of this disclosure can be applied in any field that involves large volumes of communication data to gain insights into the sentiment and emotions expressed within the data and enhance decision-making processes.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The invention claimed is:

1. An electronic communication system for audio or video call sentiment analysis, the electronic communication system comprising:
   a processor;
   a tangible, non-transitory memory configured to communicate with the processor, wherein the memory stores instructions that, when executed by the processor, cause the processor to implement:
   a data-collection engine configured to collect user data that includes communication artifacts that are sentiment-based markers;
   one or more searchable databases in communication with the data-collection engine and configured to store the user data, the one or more searchable databases is configured so that each communication artifact is tagged with metadata not already included in the communication artifact and the metadata comprises one or more of identification (ID) data, name data, time data, location data, and type of communication;
   a search engine in communication with the one or more searchable databases and configured to (a) search the one or more searchable databases for the communication artifacts, (b) analyze the communication artifacts for sentiment to create a sentiment index for a sentiment type, and (c) store the sentiment index in a sentiment index database; and
   a sentiment engine configured to (a) search and analyze the sentiment index database to determine a sentiment index for the sentiment type for a first user participating on an audio or video call, wherein the sentiment index comprises at least one of a view or an attitude of the first user, and (b) send the sentiment index for the sentiment type to a communication device of a second user participating on the audio or video call prior to the second user accepting the audio or video call so as to display on a screen of the communication device of the second user the sentiment index for the sentiment type before the second user accepts the audio or video call.

2. The electronic communication system of claim 1, wherein the electronic communication system is configured to analyze the audio or video call in real time by:
   searching, by the search engine, audio or video data of the audio or video call in real time for additional communication artifacts associated with the first user;
   analyzing, by the search engine, the additional communication artifacts for sentiment to update the sentiment index; and
   sending, by the sentiment engine, the updated sentiment index to the second user.

3. The electronic communication system of claim 1, wherein the search engine is further configured to:
   separate the sentiment into sentiment types;
   store a sentiment index for each sentiment type in a separate sentiment index database; and
   the sentiment type includes one of anger, frustration, apathy, anxiety, contentment, sadness, happiness, appreciation, enthusiasm, professionalism, responsiveness, courteousness, aggression, and satisfaction.

4. The electronic communication system of claim 3, wherein the sentiment engine is further configured to combine a plurality of the sentiment indexes into an amalgamated sentiment index.

5. The electronic communication system of claim 1, further comprising a graphical user interface configured to (a) receive the sentiment index from the sentiment engine, and (b) display the sentiment index to the second user participating on the audio or video call.

6. The electronic communication system of claim 1, further comprising a graphical user interface configured to simultaneously display the sentiment index and an option to accept the audio or video call to the second user.

7. The electronic communication system of claim 1, wherein the sentiment engine, depending on the sentiment index, does at least one of the following: (a) nothing, (b) displays the sentiment index on a graphical user interface of the second user, or (c) forwards the audio or video call to a third user.

8. The electronic communication system of claim 1, wherein the sentiment engine is further configured to:
   determine whether the sentiment index for a predetermined sentiment type is above a predetermined threshold; and
   at least one of the following: (a) terminate the audio or video call or (b) forward the audio or video call to a third user.

9. The electronic communication system of claim 1, wherein the communication artifacts include one or more of emails, chats, meeting content, recordings, internet searches and the topics or websites searched, call history, and social media posts, and are in the form of text, audio, or video.

10. The electronic communication system of claim 1, wherein the communication artifacts are analysed by a data analyser in communication with the search engine for sentiment by using one or more of (a) natural language processing (NLP) techniques for text communications, (b) the Ryerson Audio-Visual Database of Emotional Speech and Song (RAVDESS) validated multimodal database of emotional speech and song for audio or video communications, or (c) alternate sentiment analysis techniques.

11. The electronic communication system of claim 1, wherein the search engine (a) searches the one or more searchable databases for the communication artifacts, (b) analyzes the communication artifacts for sentiment to create the sentiment index for the sentiment type, and (c) stores the sentiment index in the sentiment index database in response to the first user initiating the audio or video call.

12. An electronic communication method for audio or video call sentiment analysis, the method comprising the steps of:
    using a data-collection engine, collecting user data that includes communication artifacts that are sentiment-based markers;
    storing the user data in one or more searchable databases in communication with the data--collection engine, the one or more searchable databases is configured so that each communication artifact is tagged with metadata not already included in the communication artifact and the metadata comprises one or more of identification (ID) data, name data, time data, location data, and type of communication;
    searching, utilizing a search engine in communication with the one or more searchable databases, the one or more searchable databases for the communication artifacts;
    analyzing, utilizing the search engine, the communication artifacts for sentiment to create a sentiment index;
    storing, utilizing the search engine, the sentiment index in a sentiment index database;
    searching and analyzing, using a sentiment engine, the sentiment index databases to determine a sentiment index for a sentiment type for a first user participating on an audio or video call, wherein the sentiment index comprises at least one of a view or an attitude of the first user;
    sending, using a sentiment engine, the sentiment index for the sentiment type to a communication device of a second user participating on the audio or video call prior to the second user accepting the audio or video call; and
    outputting for display on a screen of the communication device of the second user the sentiment index prior to the second user accepting the audio or video call.

13. The electronic communication method of claim 12 that further includes the step of analyzing the audio or video call in real time by:
    searching, by the search engine, audio or video data of the audio or video call in real time for additional communication artifacts associated with the first user;
    analyzing, by the search engine, the additional communication artifacts for sentiment to update the sentiment index;
    sending, by the sentiment engine, the updated sentiment index to the second user; and
    displaying, by a graphical user interface, the updated sentiment index to the second user.

14. The electronic communication method of claim 12 that further includes the step of displaying, on a graphical user interface, the sentiment index to the second user to notify the second user of a disposition of the first user.

15. The electronic communication method of claim 12 that further includes the steps of:
    determining whether the sentiment index for a predetermined sentiment type is above a predetermined threshold; and
    at least one of (a) terminating the audio or video call or (b) forwarding the audio or video call to a third user.

16. An electronic communication system for audio or video call sentiment analysis, the electronic communication system comprising:
    a processor; and
    a tangible, non-transitory memory configured to communicate with the processor, the tangible, non-transitory memory having instructions stored thereon that, in response to execution by the processor, cause the processor to perform operations comprising:
    collecting user data that includes communication artifacts that are sentiment-based markers;
    storing the user data in one or more searchable databases, the one or more searchable databases is configured so that each communication artifact is tagged with metadata not already included in the communication artifact and the metadata comprises one or more of identification (ID) data, name data, time data, location data, and type of communication;
    searching the one or more searchable databases for the communication artifacts;
    analyzing the communication artifacts for sentiment to create a sentiment index;
    storing the sentiment index in a sentiment index database;
    searching and analyzing the sentiment index databases to determine a sentiment index for a sentiment type for a first user participating on an audio or video call, wherein the sentiment index comprises at least one of a view or an attitude of the first user; and
    sending the sentiment index for the sentiment type to a communication device of a second user participating on the audio or video call prior to the second user accepting the audio or video call so as to output for display on a screen of the communication device of the second user the sentiment index prior to the second user accepting the audio or video call.

17. The electronic communication system of claim 16, wherein the operations further comprise:
    determining whether if the sentiment index for a predetermined sentiment type is above a predetermined threshold; and
    at least one of (a) terminate the audio or video call or (b) forward the audio or video call to a third user.

18. The electronic communication system of claim 16, wherein the operations further comprise analyzing the audio or video call in real time by:
    searching audio or video data of the audio or video call in real time for additional communication artifacts associated with the first user;
    analyzing the additional communication artifacts for sentiment to update the sentiment index; and
    sending the updated sentiment index to the second user for displaying, by a graphical user interface, the updated sentiment index to the second user.

19. The electronic communication system of claim 16, wherein the operations further comprise displaying, on a graphical user interface, the sentiment index to the second user to notify the second user of a disposition of the first user.

* * * * *